US007680843B1

(12) United States Patent
Panchbudhe et al.

(10) Patent No.: US 7,680,843 B1
(45) Date of Patent: Mar. 16, 2010

(54) METHOD AND SYSTEM TO OFFLOAD ARCHIVING PROCESS TO A SECONDARY SYSTEM

(75) Inventors: Ankur P. Panchbudhe, Pune (IN); Aditya A. Gokhale, Pune (IN); Angshuman Bezbaruah, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 207 days.

(21) Appl. No.: 11/527,027

(22) Filed: Sep. 26, 2006

(51) Int. Cl.
*G06F 17/30* (2006.01)
(52) U.S. Cl. .................................... 707/204; 707/205
(58) Field of Classification Search .......... 707/204–205
See application file for complete search history.

(56) References Cited

U.S. PATENT DOCUMENTS

| 6,035,412 | A | 3/2000 | Tamer et al. ............ 714/6 |
| 7,269,612 | B2 * | 9/2007 | Devarakonda et al. ...... 707/205 |

OTHER PUBLICATIONS

Gerr, Peter A. and Steve Duplessie, "Mimosa NearPoint-Unified Protection, Archiving, and Recovery for Microsoft Exchange," Enterprise Strategy Group, Milford, MA, Aug. 2005, pp. 1-4.
Spurzem, Bob, "Advantages of Mimosa NearPoint™ for E-Mail Archival," Mimosa Systems, Inc., Santa Clara, CA, Jan. 2005, 14 pages.
Spurzem, Bob, "Challenges with Traditional Data Management Solutions for Exchange," Mimosa Systems, Inc., Santa Clara, CA, Jan. 2005, pp. 1-13.
Spurzem, Bob, "Mimosa NearPoint™ Advantages over Traditional Tape Backup Methods for Microsoft Exchange," Mimosa Systems, Inc., Santa Clara, CA, Jan. 2005, 12 pages.
Spurzem, Bob, "Mimosa NearPoint™ for Microsoft® Exchange Server," Mimosa Systems, Inc., Santa Clara, CA, Jan. 2005, 18 pages.
Mimosa Systems, Inc., "Performance Enhancement," downloaded Mar. 21, 2006 from http://www.mimosasystems.com/html/sol_perform.htm, 1 page.
Mimosa Systems, Inc., "Storage Management," downloaded Mar. 21, 2006 from http://www.mimosasystems.com/html/sol_storage.htm, 1 page.
Unpublished U.S. Appl. No. 11/551,018, filed Oct. 19, 2006, entitled "Method for Restoring Documents from a Database File," naming Louis Beatty and Steve DeVos as inventors, as assigned to Symantec Operating Corporation.

* cited by examiner

*Primary Examiner*—Yicun Wu
(74) *Attorney, Agent, or Firm*—Campbell Stephenson LLP

(57) ABSTRACT

Procedures and systems may be used for archiving data from a secondary data set that is a stable copy of a primary data set. In one implementation, the secondary data set is a continuous data protection (CDP) copy of the primary data set. One implementation of a method includes receiving an application programming interface (API) request for archive-eligible data, gathering application data from a secondary data set, obtaining archive-eligible data from the gathered application data, and responding to the request instruction with the archive-eligible data. The gathering is performed by a gathering circuit configured to obtain information from a plurality of types of secondary data sets. The method also includes receiving API modification instructions related to the archive-eligible data, and causing the modification instruction to be performed on the primary data set.

30 Claims, 6 Drawing Sheets

METHOD AND SYSTEM TO OFFLOAD ARCHIVING PROCESS TO A SECONDARY SYSTEM

BACKGROUND OF THE INVENTION

1. Field of the Invention

This invention relates generally to storage systems, and more particularly, to procedures and devices for archiving data.

2. Description of the Related Art

As the capacity of data storage systems grows, user practices and behaviors change as well. In particular, the practice of periodically reviewing old files and folders may take on less and less importance as the cost of storage declines. For example, a 1 megabyte (MB) file once was considered a large item by many users. If such a file were no longer needed, a user might delete that file so that storage space would not remain locked up, dedicated to an unnecessary file. As storage has become cheaper, however, the amount of effort that a user may spend on purging unneeded files and data has declined. Indeed, many users may not feel the need to periodically review their files and other data. As a result, information systems may suffer from the presence of large amounts of unneeded data occupying storage space on the disk drives of file servers and other storage systems.

Archive servers may be used to store low-priority information, thus removing the burden of storing such information from servers that carry out production operations in a data-processing environment. An archive program can remove such information from a production server to an archive server. However, the interaction between the archive program and the production server can be costly in terms of the load it places on production server. Thus it would be useful to employ tools and techniques that may reduce the added load on a production server for archiving operations.

SUMMARY OF THE INVENTION

Described herein are procedures and systems that may be used for archiving data from a secondary data set. The secondary data set may be a stable copy of a primary data set that is maintained on a primary server such as a production server. The secondary data set may be stored on a secondary server, such as continuous data protection (CDP) server or other backup server.

In one implementation, a method includes acts of receiving a request instruction compliant with an application interface, gathering application data from a secondary data set, obtaining archive-eligible data from the application data in response to the request instruction, and responding to the request instruction with the archive-eligible data. The secondary data set includes data from a primary data set, and is separate from the primary data set. The request instruction may include one or more criteria for selecting the archive-eligible data. The gathering is performed by a gathering circuit configured to obtain information from a plurality of types of secondary data sets. The method may also include acts of receiving a modification instruction compliant with the application interface. The modification instruction may be related to the archive-eligible data. The method may then cause the modification instruction to be performed on the primary data set.

The modification on the primary data set may be performed, for example, by passing the modification instruction to an application that interacts with the primary data set, or by directly modifying the primary data set. The modification may delete the archive-eligible data from the primary data set. Additionally, or instead, the modification may add a pointer, stub, or other reference to an archived copy of the archive-eligible data onto the primary data set.

One implementation of a system includes a first interface, a second interface coupled to the first interface, and a third interface coupled to the first interface. The first interface is configured to receive and respond to instructions compliant with an application interface. The second interface configured to gather application data from a secondary data set, and to obtain archive-eligible data from the application data in response to instructions received by the first interface. The secondary data set includes data from a primary data set, and is separate from the primary data set. The second interface is configured to obtain information from a plurality of types of secondary data sets. The third interface is configured to cause modifications on a primary data set in response to modification instructions received by the first interface.

The foregoing is a summary and thus contains, by necessity, simplifications, generalizations and omissions of detail. Consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

DETAILED DESCRIPTION

Figure 1:
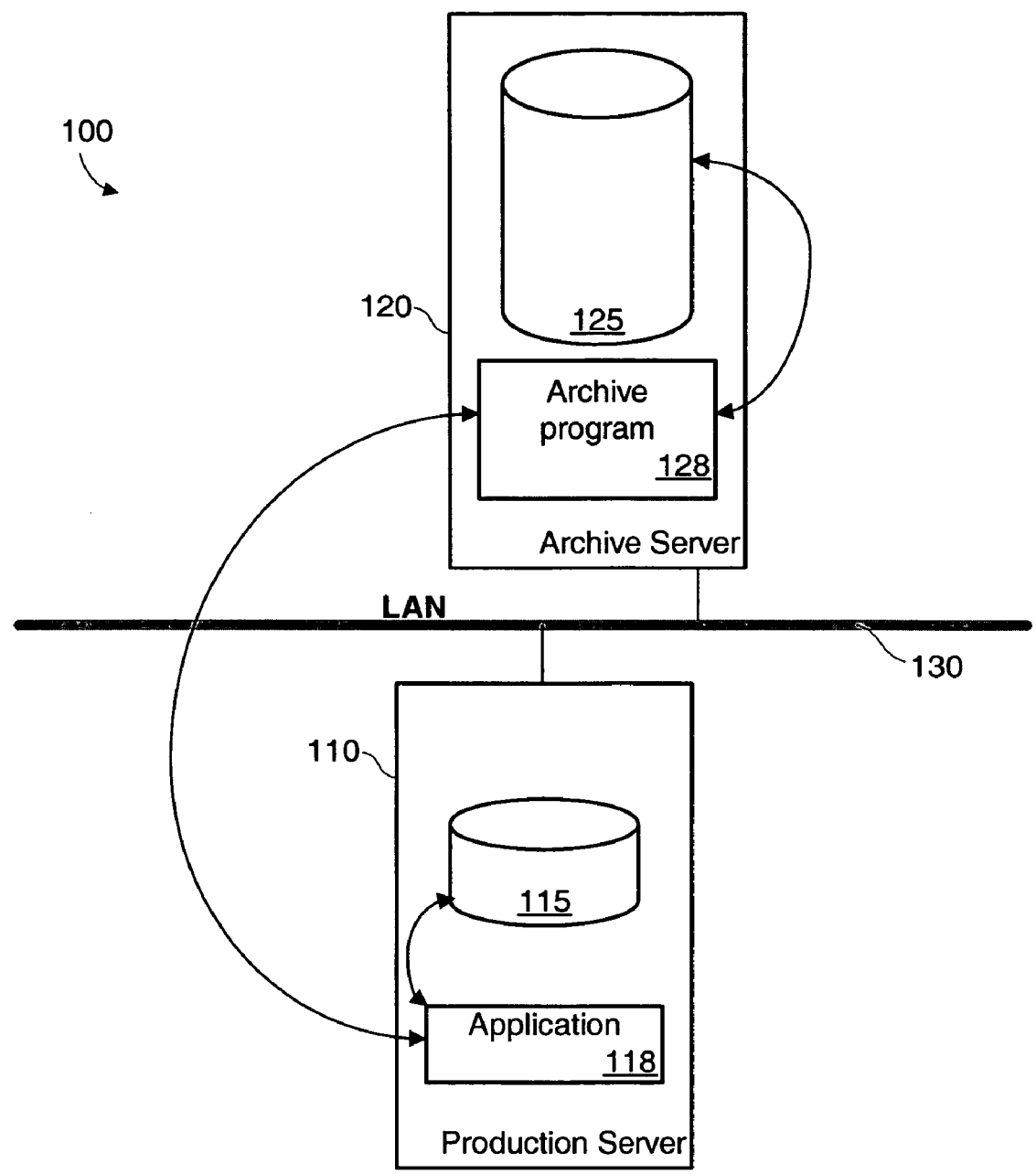
FIG. 1 is a block diagram of a network linking a production server with an archive server.

The problem of storing and managing low-priority data is compounded by the accelerating use of shared services such as email applications, and by the growing size of data files. It has become more common for multiple recipients to be designated as recipients of a single email message. Additionally, the email message may include ever-larger attachments. For example, it may be normal practice in some environments for an email message to be sent to thirty recipients within a company. The message may include attachments such as documents, slide shows, and video clips that may total twenty MB of information or more. The result may be this one email message burdens the company's storage systems with a new load of 600 MB or more. Various space-saving measures may partially address this problem, for example by storing a single copy of an email or attachment on a recipient email server, and sharing that copy among all the local recipient users. But such measures may not work in all situations, for example, in cases where separate emails are sent to each recipient user. Whether the email and the attachments are crucial business information or not, whether each recipient of the message needs the information or not, and whether the email remains valuable over time or not, the 600 MB of data may continue to sit on the storage systems until the users manually review and delete the messages and/or attachments. As storage continues to become cheaper, the cost of wasting 600 MB may decline, but the problem generally persists nonetheless. As storage becomes cheaper, the size of email attachments and other data files also tends to grow, so that the efficient usage of space generally remains a challenge for system administrators. A related issue is the impact of the growth on the performance of a server. As the amount of stored data grows on email servers, file servers, database servers, and others, the growth can hinder the performance of the servers. Yet another issue is that the overhead of managing storage also increases with the growth of stored information.

Various automated systems are used to address the problem of unneeded or low-priority data. A simple approach involves automatically deleting data that appears not to be used. Of course, such a destructive approach may be costly if it mistakenly deletes valuable information. Another approach is automatically to archive data that may no longer be in active use by a user. The archiving may selectively move lower-priority data to lower-cost storage. Archiving operations may be used to address the impact of the growth on the performance of a server. Archiving operations may also be used to alleviate storage management overheads. Arching operations may also be used to comply with regulations that require archival of old emails, documents, and data. In addition to meeting regulatory requirements, archiving may also be used by a business operation to protect data that could be useful later for legal discovery. (In some environments, the storing of old emails, files, and data for regulatory compliance, future research, and legal discovery can also result in storage growth; the burdens of this growth can be alleviated through archiving operations). Archiving may thus be helpful to assist in reducing the burdens of growth, or to address regulatory, legal, or research considerations, or combinations thereof.

A local network may include various grades of data storage. For example, FIG. 1 is a block diagram of a network 100 linking a production server 110 with an archive server 120. The depicted servers 110 and 120 are connected through a local area network (LAN) 130. Production server 110 includes a storage 115 such as one or more disk drives, semiconductor memories, or other rapid-access storage devices that are capable of quickly responding to requests for data kept on storage 115. Archive server 120 includes an archive storage 125, such as one or more disk drives, semiconductor memories, tape drives, disk carousels, or other high-quantity and/or lower-cost storage devices. Archive server 120 may be configured so that it can provide adequate access to seldom-needed data. System administrators may then use archive server 120 as a repository for such data, thereby reducing the storage demands on production server 110 and the storage 115 in the production server.

Production server 110 includes an application program 118, such as an email server. Application program 118 uses and generates data that is locally stored on storage 115. Archive server 120 includes an archive program 128 that interacts with application program 118. Archive program 128 periodically interrogates application program 118 to determine whether any of the data on storage 115 is suitable for archiving. If application program 118 determines that one or more email messages should be moved to archive server 120, then the two programs 118 and 128 coordinate to copy those messages onto archive storage 125, and to delete those messages from the production server storage 115. An example of software that may be used to implement some functions of an archive program is Enterprise Vault by Symantec Corporation.

This interaction between archive program 128 and application program 118 can be costly in terms of the load it places on production server 110. Production server 110 is involved with analysis of the data on storage 115, and with the transfer of data to archive server 118. This involvement may impinge on the ability of the production server to perform its primary functions, such as providing email services and/or other computational tasks.

Figure 2:
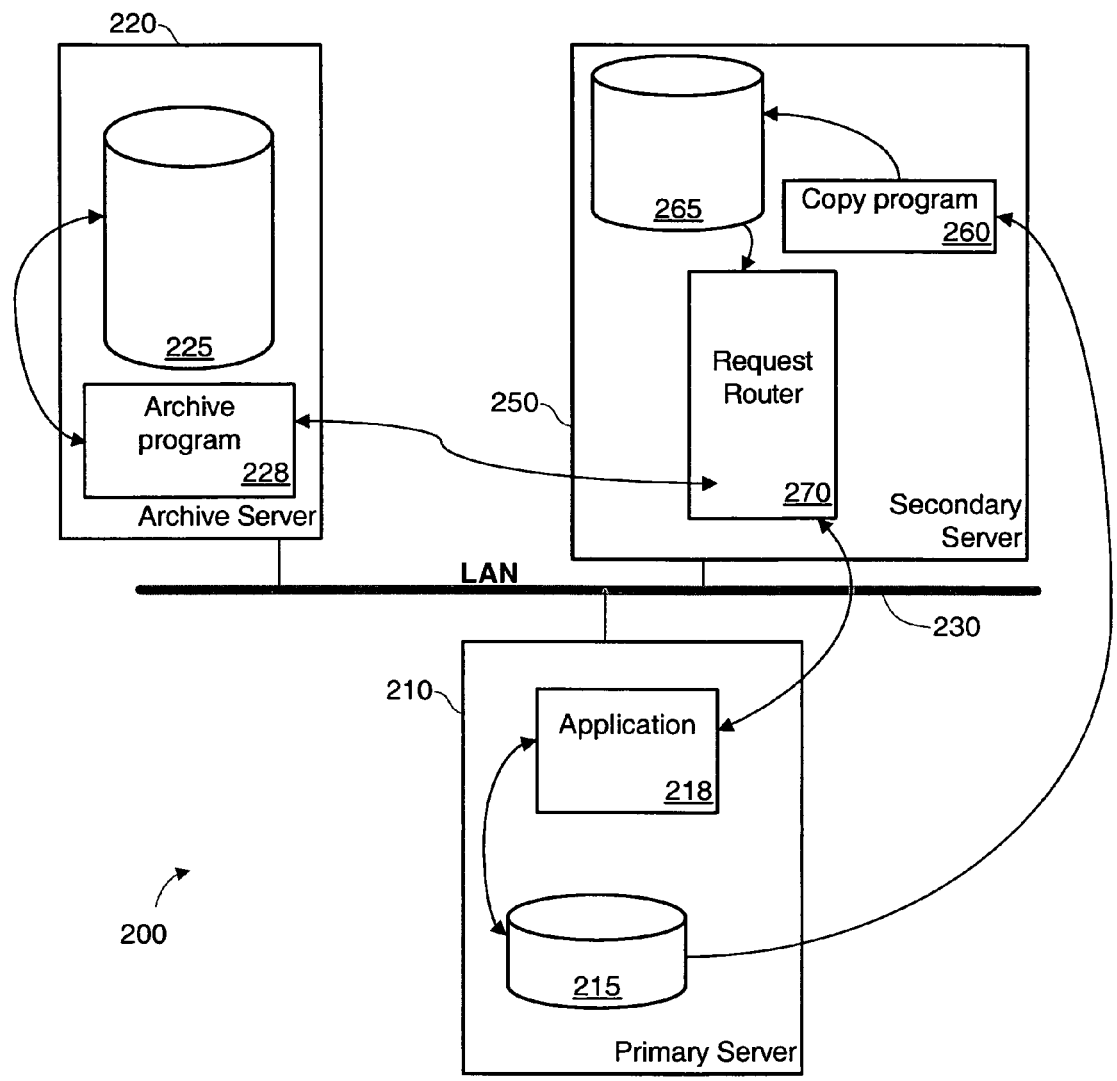
FIG. 2 is a block diagram of one implementation of a network linking a primary server, a secondary server, and an archive server.

FIG. 2 is a block diagram of one implementation of a network 200 linking a primary server 210, a secondary server 250, and an archive server 220. The depicted servers 210, 220, and 250 are connected through a LAN 230. Instead of, or in addition to a LAN, network 200 may use a storage area network (SAN), or a connection through a wide area network (WAN), such as the Internet, to link various servers.

Primary server 210 includes one or more application program 218, such as an email server, a file server, or a database manager. Application program 218 is executed on one or more processors in primary server 210. Primary server 210 also includes a primary storage 215 such as one or more disk drives, semiconductor memories, or other rapid-access storage devices that are capable of quickly responding to requests for data kept on primary storage 215. Application program 218 uses and generates data that is stored locally on primary storage 215.

Secondary server 250 includes a copy program 260, a secondary storage 265, and a request router 270. Copy program 260 copies data from primary storage 215 onto secondary storage 265. This copying may be performed to provide a stable copy of data from the primary storage for a variety of purposes. For example, the copying may be used to provide a failure-safe backup copy of the data used by the primary server. Also, or instead, the copying may be used to provide an auxiliary source of data that is maintained on the primary server, such as a set of replicated volumes. In this sense, the secondary server may serve as a mirror of the primary server. Also, or instead, the copying may be used to provide a snapshot of data from the primary server. Various types of snapshots may be used, such as block level snapshots, device level snapshots, host-based snapshots, file level snapshots, application level snapshots, or others. Snapshots may include one or more full-data collection, augmented by incremental updates such as log files that record subsequent changes.

Copy program 260 may use block copying techniques, file copying techniques, copy-on-write techniques, periodic updating, scheduled updating, occasional updating, continuous updating, or other approaches to copying, or combinations thereof, to provide secondary storage 265 with a stable copy of data from primary storage 215. The copy on secondary storage may be a full or a partial copy of all the data from primary storage 215.

In one implementation, the copy maintained by copy program 260 on secondary storage 265 includes a full, continuously updated direct and exact copy of a specified set of data from primary storage 215, with the copy formatted in files as on the primary storage. Alternatively, another implementation of the copy can is a continuously updated set of data that includes the information from the primary storage, but is stored in a different structure, for example, using incremental files that record logs of ongoing changes to the information. The specified set of data may be complete collections of data that are used by one or more applications executed on primary server 210. For example, as configured by an administrator, copy program 260 may continuously update secondary storage 265 to hold a complete set of data from a Microsoft Exchange Server® database from primary storage 215, as well as a complete set of data from an Oracle® database management system (DBMS) database from primary storage 215.

Archive server 220 includes an archive program 228 that archives information that originates on the primary server. In various implementations of the invention, archive program 228 includes some of the same functions as the corresponding archive program 128 discussed above with respect to FIG. 1. In some implementations of the invention, archive program 228 is the same as archive program 128. As discussed below, archive server 220 does not interact directly with primary server 210 in the depicted example network 200. Instead, archive server 220 obtains data to be archived, and otherwise communicates with primary server 210 through request router 270 in secondary server 250.

To initiate communications between archive program 228 and request router 270, the archive program is pointed to the request router by a user through a graphical user interface. Alternatively, or in conjunction, the connection with the request router may be made using a configuration file that stores appropriate information, for example in text format or in eXtensible Markup Language (XML) format. In yet another implementation, the archive program includes an automatic discovery tool that assists in locating and interfacing with the application program.

Archive server 220 includes an archive storage 225, such as one or more disk drives, semiconductor memories, tape drives, disk carousels, or other high-quantity and/or lower-cost storage devices. Archive server 220 may be configured so that it can provide adequate access to seldom-needed data or other low-priority data that do not need to be stored on the primary server. System administrators may then use archive server 220 as an archival repository for such data, thereby reducing the storage demands on primary server 210 and the primary storage 215.

It is noted that in this sense, archiving operations are different from backup operations. Backup operations may be used to provide redundancy, so that data may be recovered or restored in the wake of equipment malfunctions, device failures, processing errors, manual errors, or other events that may destroy or corrupt data. Archival operations may incidentally provide redundancy, but a primary purpose of archival operations is to reduce a storage load or a processing load on a system that would otherwise be weighed down with accumulated but low priority data (such as seldom-used or never-used data). Archival operations may thus include paring of original data collections after low priority data has been copied from the original data collection into an archival data collection. In addition to reducing the cost of storage, archival may improve the performance of an otherwise burdened system, and may also be used to partially automate the management of data storage. Another possible use of archival is regulatory compliance for the preservation of data, and the preservation of data for future research or legal discovery. Depending on the details of the archiving functions, some or all of the low priority data may be deleted from the original data collection, so that it then exists only in the archival data collection. Nonetheless, it is contemplated that various backup operations may be combined with archiving operations in various embodiments of the invention.

It is contemplated that, depending on the details of the archiving functions, pointers, addresses, or other references to the archived data may be provided in the original data collection, so that the archived data may be readily accessed if and when it is needed. The references to the archived data may be in a user-readable form, or they may be transparent to a user.

As an example, in a particular deployment of the network 200, application 218 is an instance of the Microsoft Exchange Server email software. Application 218 reads and stores information in an Exchange database on primary storage 215. The Exchange database may grow over time, and may be burdened with email messages and attachments that are not often used by users of the email system. For example, old email messages forgotten by users may include large attachments that can unnecessarily occupy space on primary storage 215. Such email messages (and/or their attachments) may be copied onto archive storage 225 and deleted from primary storage 215, thereby freeing space on the primary storage 215. This archiving function is performed by archive program 228.

For the convenience of users, archive program 228 can place a helpful reference on the primary storage so that, if needed, a user can find the archived copy of an email message (and/or the archived copy of an attachment). It is contemplated that this reference can user-readable, or can be made in a format that is transparent to the user. For example, a large and seldom-accessed attachment in an email message may be archived so that it is deleted from an Exchange database on primary storage 215 and stored instead on archive storage 225. The original attachment in the Exchange database may be replaced by an alias, a pointer, or other stub file that, when invoked, automatically references the archived copy of the original attachment.

As illustrated in FIG. 2, archive program 228 interfaces with request router 270 instead of interacting directly with the application program 218. At least a part of the processing load and input/output (I/O) load that are caused by archiving operations may thus be off-loaded from the primary server, to be borne instead by the secondary server. For example, instead of taxing the primary server 210 with searches and other overhead of obtaining data to be archived, request router 270 responds to inquiries from archive program 228 by obtaining data to be archived from the stable copy that is available on secondary server 250.

Request router 270 interacts with primary server 210 when needed to modify data on primary storage 215. When archive program 228 issues instructions to delete data from the primary storage, request router 270 conveys those instructions to primary server 210. Similarly, when archive program 228 issues instructions to augment primary storage 215 with a pointer, alias, stub file or other reference to the location of archived data on archive storage 225, request router 270 also conveys those instructions to primary server 210. In one implementation, the request router includes a processor and appropriate software running on the secondary server 250. Alternatively, or in addition, the request router may be implemented in a logic circuit. It is also contemplated that the request router may be implemented in software or in logic on archive server 220 or on another computing device.

Figure 3:
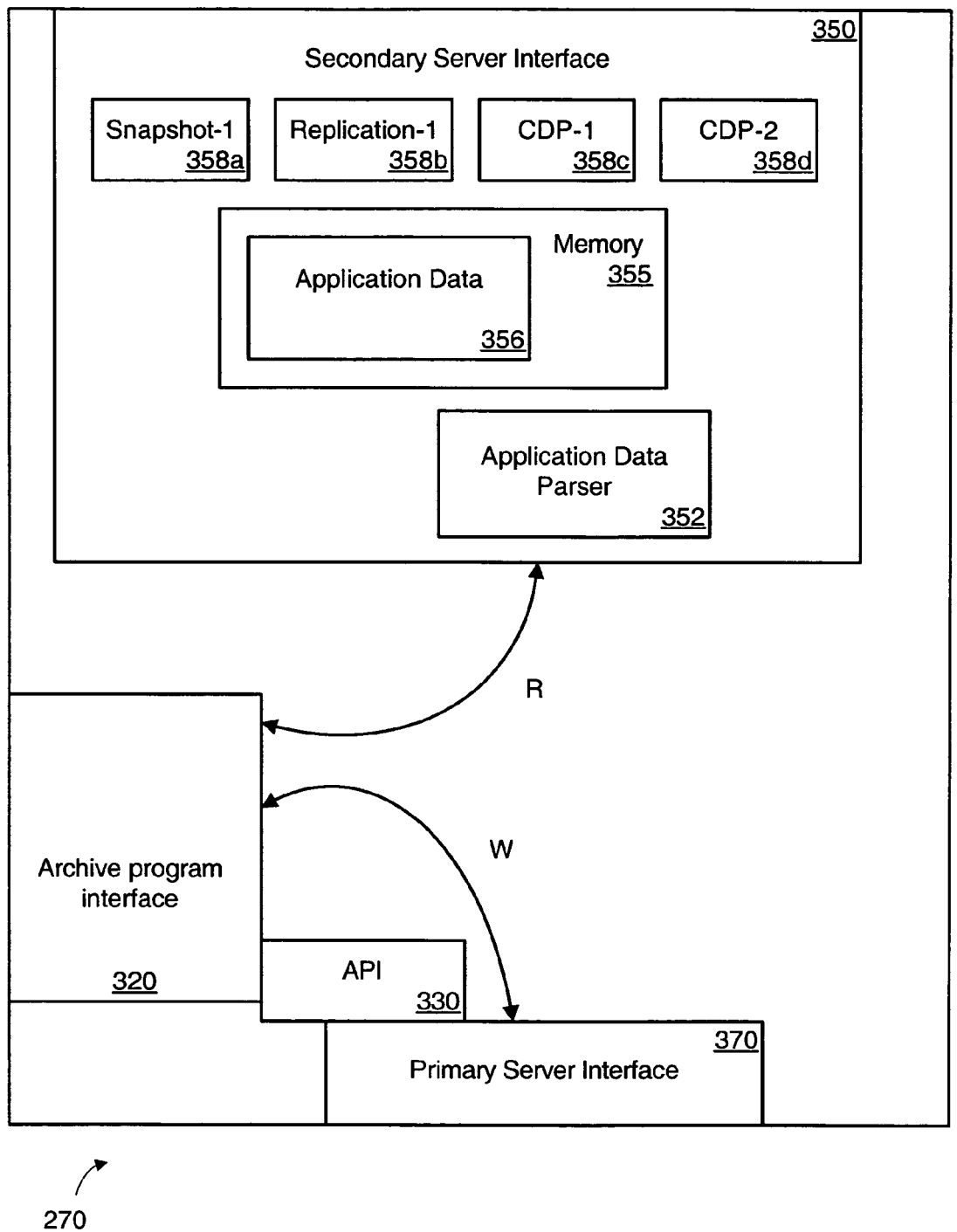
FIG. 3 is a block diagram of one implementation of a request router from FIG. 2.

FIG. 3 is a block diagram of one implementation of request router 270 from FIG. 2. Request router 270 includes an archive program interface 320, a primary server interface 370, and a secondary server interface 350. Archive program interface 320 communicates with archive program 228 (from FIG. 2). Secondary server interface 350 includes an application data parser 352, a memory 355, and storage format modules 358*a*, 358*b*, 358*c*, and 358*d* (collectively, storage format modules 358) that enable communication with secondary storage 265. Primary server interface 370 communicates with primary server 210.

Request router 270 includes an application programming interface (API) module 330. API module 330 enables primary server interface 370 to communicate with application program 218 running on primary server 210. API module 330 also enables archive program interface 320 to communicate with archive program 228 running on archive server 220.

In one deployment of request router 270, API module 330 is a Messaging Application Programming Interface (MAPI) module. Primary server interface 370 uses the MAPI module to communicate with an instance of Microsoft Exchange Server running on primary server 210. Archive program interface 320 also uses the MAPI module. With the MAPI module, archive program interface 320 can receive and interpret MAPI calls from an archive program that is configured to communicate directly with an instance of Microsoft Exchange Server. By using the MAPI module, archive module interface 320 can communicate with an archive program even if the archive program is configured to communicate only with instances of Microsoft Exchange Server.

Archive program interface 320 communicates with archive program 228 on the archive server using API calls. When archive program interface 320 receives API calls from the archive program 228, the archive program interface 320 responds in a manner that depends on the nature of the received API calls. If the received API calls are directed to updating data (for example, deleting recently archived data, or replacing archived attachment with a stub file or other reference), the archive program interface 320 conveys the received API calls to primary server interface 370. Primary server interface 370 then forwards the API calls to the application 218 on primary server 215.

However, if the received API calls represent requests for obtaining or searching for data to be archived, the primary server interface 370 does not burden the primary server with these requests for data. Instead, the archive program interface 320 passes the requests to secondary server interface 350. This routing of requests is indicated in FIG. 3 by the letters "R," for read-related calls that are managed by the secondary server interface, and "W," for write-related calls that are managed by the primary server interface.

Secondary server interface 350 receives the requests for obtaining or searching for data to be archived. In order to respond to the requests, secondary server interface 350 gathers relevant application data 356 that either holds the data to be archived or holds data that is to be searched for data to be archived. In one deployment of the secondary server interface, the gathered application data 356 is an Exchange database, or a portion thereof.

Secondary server interface 350 gathers the application data 356 from secondary storage 265. To assist with reading application data from the secondary storage, the depicted secondary server interface includes the four storage format modules 358a-d, each of which enables the secondary server interface 350 to read data from one type of secondary storage.

With the storage format modules 358, the request router 270 may be deployed on a variety of types of secondary servers. The storage format modules 358 provide some adaptability to the request router 270 because various types of secondary storage may use various storage formats to store data.

For example, in situations where secondary storage 265 holds a direct copy or a replication of primary storage 215, the application data may be stored on secondary storage 265 in a standard file server format. However, in situations where secondary storage 265 is a snapshot backup of primary storage 215, the application data may be stored on secondary storage 265 in a series of files that include complete backup collections along with chronologically ordered (or reverse-chronologically ordered) log files that indicate incremental changes to the application data over time. Similarly, in situations where secondary storage 265 is a CDP storage, the application data may be stored on secondary storage 265 in a collection of files that are related according to a particular CDP protocol. Various forms of CDP storage include transaction log shipment CDP data, stable copy and incremental log shipment CDP data, message shipping CDP data, file operation shipping CDP data, and change to block CDP data. Each of these storage formats requires appropriate tools for reading the data from the secondary storage.

These tools are provided by the appropriate storage format modules 358. In the depicted example, secondary server interface 350 uses storage format module 358a if the secondary server interface 350 has been installed on a particular type of snapshot-based secondary server. Similarly, secondary server interface 350 uses storage format module 358b if the secondary server interface 350 has been installed on a secondary server that replicates primary storage. As depicted, secondary server interface 350 can also be readily installed on two types of CDP servers. In such situations, secondary server interface 350 uses storage format module 358c or 358d corresponding to two particular types of CDP servers (labeled as "CDP-1" and "CDP-2"). In one implementation of the request router, one or more of the storage format modules 358 is hard-coded as a software component of the request router. Alternatively, or in addition, the storage format modules 358 may be plug-in modules.

Using the appropriate storage format module 358, secondary server interface 350 gathers the requested application data 356 from secondary storage 265 and loads or streams the application data into memory 355. In one implementation, the secondary server interface 350 selects the appropriate storage format module 358 based on a user input that identifies the storage format being used. In another implementation, the secondary server interface 350 includes automatic detection tools to identify the storage format being used. Automated detection may be performed, for example, by examining the first few bytes or blocks of data in an image on the secondary server. Information regarding the file formats or implementation formats is customarily present among this information, often in the form of data that effectively identifies the type of storage format. In some situations, treating such information as a "magic number" identifier can serve as a sufficient tool for determining the storage format being used.

The data that are gathered can depend on the request that was received from archive program 228. If the request was directed to a specific file, data record, or attachment, then secondary server interface 350 may need to read only one or a few files (such as a limited set of log files) from secondary storage 265. Similarly, the request may be directed to particular search criteria for data to be archived. For example, the archive program may seek particular files or data for archiving according to criteria such as file properties (e.g., last access date, file size, creation date, revision date, file name, user name, user ID, path information), email message properties (e.g., last access date, recipient, sender, sent date, origin domain, subject, and other header information, email size, attachment size), and database record properties (e.g., last access date, record size, creation date, revision date, user name of most recently accessing users, record numbers, record addresses), among others. In such cases, secondary server interface 350 may need to read larger portions of the data available on secondary storage 265. In some situations, secondary server interface 350 may need to read or parse through the entire collection of data available on secondary storage 265 to gather the relevant application data. Thus, based on the request, secondary server interface 350 may reconstruct an entire copy of an application database in memory 355, or reconstruct only one or more portions of an application database in memory 355.

Application data parser 352 reads or examines the application data gathered in memory 355. In one deployment of the secondary server interface, the gathered application data 356 is Exchange data and application data parser 352 includes a Microsoft Joint Engine Technology (JET) database reader engine that enables the data parser to read Exchange data, which is typically stored in a JET database. Application data parser 352 uses the data gathered in memory 355 to respond to the request from the archive program 228. If the request was for particular data, application data parser 352 either responds with a "NOT PRESENT" message or transmits the requested data back to the archive program 228 through archive program interface 320. If the request was a search for data that meet particular archiving conditions, then application data parser 352 either responds with a "NOT FOUND" message or transmits the requested data back to the archive program 228 through archive program interface 320. The data to be archived are thus provided to archive server 220 without requiring additional interaction with primary server 210.

Various alternatives of the request router are contemplated. As discussed above, storage format modules 358 and application data parser 352 operate according to requests received from archive program 228. The requests are initially received as API calls by archive program interface 320. Within request router 270, the requests are translated (by API module 330) from API calls into local operation instructions that are provided to storage format modules 358 and application data parser 352. The above examples include deployments where application 218 is Microsoft Exchange Server and archiving is performed on Exchange databases. While these examples relate to email applications, and particularly to Exchange, the request router is not limited to working only with Exchange, or email applications. Other types of applications and data formats are also contemplated as being addressed by various implementations of the request router.

For example, application 218 may be a different type of email server, or a file management system, or a database management system, or other application that uses files or other data for which archiving may be beneficial. In another example deployment, application 218 is an instance of an Oracle DBMS, and API module 330 is an Oracle Call Interface (OCI) module. Primary server interface 370 uses the OCI module to communicate with the Oracle DBMS running on primary server 210, and archive program interface 320 uses the OCI module to receive and interpret OCI calls from an archive program that is configured to communicate directly with an instance of Oracle DBMS. By using the OCI module, archive module interface 320 can communicate with an archive program even if the archive program is configured to communicate only with instances of Oracle DBMS.

In yet another deployment of a request router (not illustrated), multiple API modules are included the request router. The request router can then be used to support several archive programs, configured to communicate directly with different types of applications. For example, if the request router is configured with a MAPI module and an OCI module, the request router can receive and interpret MAPI calls from an archive program that is configured to communicate directly with an instance of Microsoft Exchange Server, and can also receive and interpret OCI calls from an archive program that is configured to communicate directly with an instance of Oracle DBMS. In various implementations, the API modules may be coded as integral software components of the request router, and/or may be made available as plug-in modules.

In addition to the exemplary embodiments described above, various adaptations and modifications thereof are also contemplated. For example, although the request router has been depicted in the above examples as being deployed on the secondary server, the request router may alternatively be executed on the archive server. Similarly, the archive program may be executed on the secondary server. It is also contemplated that the archive server may be subsumed in to the secondary server.

Figure 4:
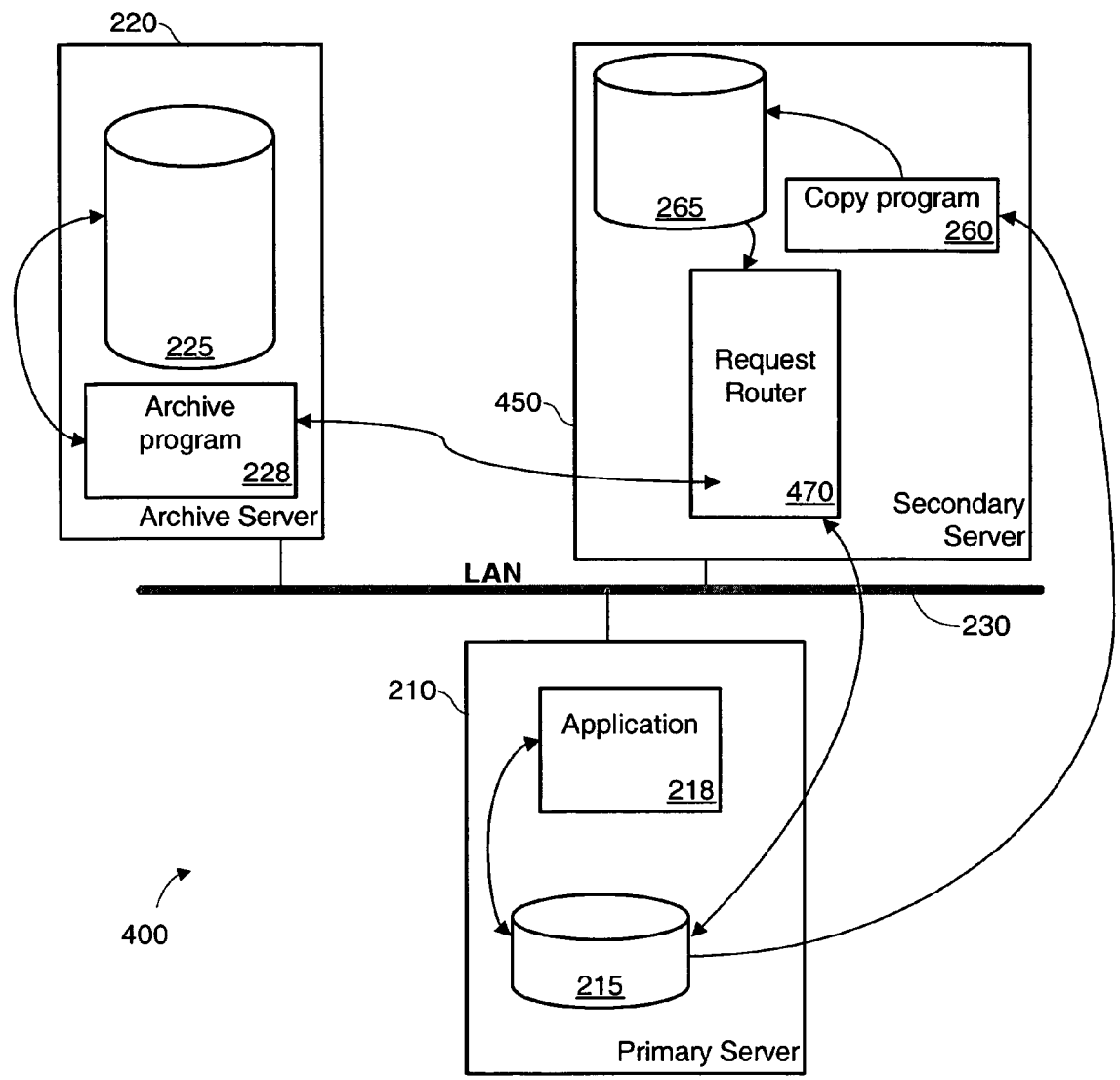
FIG. 4 is a block diagram of a second implementation of a network linking a primary server, a secondary server, and an archive server.

FIG. 4 is a block diagram of a second implementation of a network 400 linking primary server 210, a secondary server 450, and archive server 220. In this implementation, secondary server 450 includes a request router 470 that is capable of making updates onto the primary storage 215, without requiring the assistance of application 218. This implementation may be achieved, for example, by modifying the request router from FIG. 3 so that the primary server interface can use the application data parser. With appropriate modifications, the primary server interface can then read and write directly into application data stored on primary storage 215.

Figure 5:
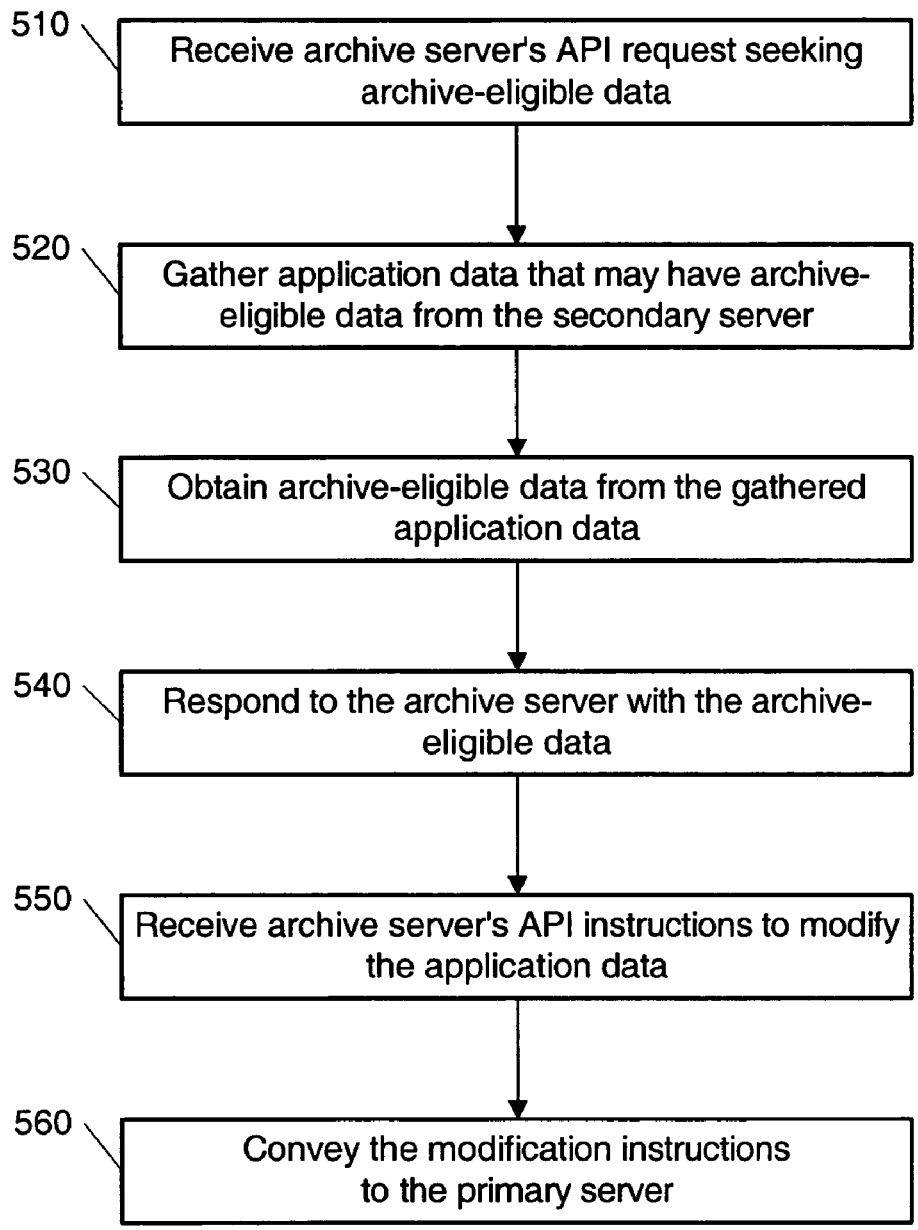
FIG. 5 is a flow diagram of one implementation of a method for archiving data.

FIG. 5 is a flow diagram of one implementation of a method 500 for archiving data. The method begins in act 510 by receiving a request instruction compliant with an application interface. The request instruction may be received from an archive server, in an API format for an application that uses the data being archived.

In act 520, the method gathers application data from a secondary data set that includes data from a primary data set. The primary data may be stored on a production server, and the secondary data set may be a stable copy of the primary data set, stored on a backup server. The secondary data set is separate from the primary data set. The gathering is performed by a gathering circuit configured to obtain information from a plurality of types of secondary data sets. In one implementation of the method, the gathering circuit is a processor that executes appropriate software on the backup server. The gathering circuit may alternatively be implemented in an archiving logic, or in logic or software on a secondary server or an archive server. The gathering circuit may include a processor executing software instructions adapted to read a plurality of backup formats, such as one, or two, or more different backup formats. For example, the gathering circuit may be capable of reading two different snapshot formats. As another example, the gathering circuit may be capable of reading two different types of incremental log shipment CDP formats. Other types of secondary data sets that can be accessed by implementations of the gathering circuit include various mirrors, replications, block level snapshots, device level snapshots, host-based snapshots, file level snapshots, application level snapshots, other snapshot formats, chronologically ordered log files, reverse-chronologically ordered log files, transaction log shipment CDP formats, stable copy and incremental log shipment CDP formats, message shipping CDP formats, file operation shipping CDP formats, change to block CDP formats, and other CDP formats.

The method continues in act 530 by obtaining archive-eligible data from the application data in response to the request instruction. The obtaining may include searching the application data according to criteria specified in the request instruction. In act 540, the method responds to the request instruction with the archive-eligible data.

In act 550, the method receives a modification instruction compliant with the application interface and related to the archive-eligible data. The modification instruction may include an instruction to replace the archive-eligible data with a reference to an archived copy of the archive-eligible data. The method causes the modification instruction to be performed on the primary data set in act 560. The modification instruction may be carried out by conveying the modification instruction to an application that interacts with the primary data set. Alternatively, the modification instruction may be carried out by directly modifying the primary data set.

In some deployments, a request router may be deployed on a secondary server that retains previous versions of data from a primary server. For example, a CDP secondary server may be configured to maintain a real-time copy of data on a primary server, but in addition may also preserve old information that has been deleted from the primary server. A block-level secondary server may offer this feature by replicating block-level reads and writes from the primary server onto the secondary server, but not replicating any over-writings or deletions of old blocks of information. Instead, the old blocks can be preserved as prior versions of the current real-time blocks. The current real-time blocks are then stored along with the old blocks, so that both current and old blocks are available on the secondary server. The old blocks are then available on the secondary server in case a previous state of data needs to be recovered. Similarly, a file-level secondary server may replicate the reads, writes, locks, opens, and other file-level operations from a primary server, but may avoid replicating over-writes or deletions of files. Instead, the old versions of files are preserved as prior versions of the current files, so that the previous versions of files are stored on the secondary server, as well as the current versions.

A request router may be configured to take advantage of the previous versions of data that may be retained on a secondary server. For example, some implementations of storage format modules 358c and 358d (from FIG. 3) may be additionally configured to gather multiple versions of data, including the most recent version of data as well as one or more previous versions of the data, from the secondary storage. The application data parser 352 may be configured to read or examine the multiple versions of the data, so that current as well as past versions of the relevant data are made available in response to an archiving request. Such past versions may be useful, for example, to enhance the completeness of an archive.

For example, when an archiving operation is invoked, archive-eligible data may be available on a secondary server as a current copy of a data on a primary server. At that time, the past versions of the archive-eligible data may no longer be available on a primary server. For example, they may have been overwritten by the current data. The past versions may, however, be preserved on the secondary server. Obtaining these past versions from the secondary server may improve the completeness of an archive. Such considerations may be useful, for example, in ensuring compliance with regulations, so that archives are sufficiently complete according to the regulations.

Additionally, obtaining the past versions of data from the secondary server may assist by further reducing the load of operations on a primary server. For example, some deployments of primary email servers operate a journal mailbox that tracks all incoming and outgoing emails. The journal mailbox preserves each email, even after a user's particular copy of an email has been deleted, so that all emails can be preserved according to a retention policy. But the benefits of a journal mailbox may come at cost: the journal mailbox may impose an undesired processing burden and/or an undesired storage burden on a primary server. However, if the email data is backed up onto a secondary server that retains previous versions of data from a primary server, then all emails (including user-deleted messages) may be preserved, at least for some time, on the secondary server. The archive server may then obtain and archive the complete set of emails from the secondary server. By enhancing the completeness of the archiving operation, such a system may reduce or eliminate the need for a journal mailbox, thereby reducing a load on the primary server.

Figure 6:
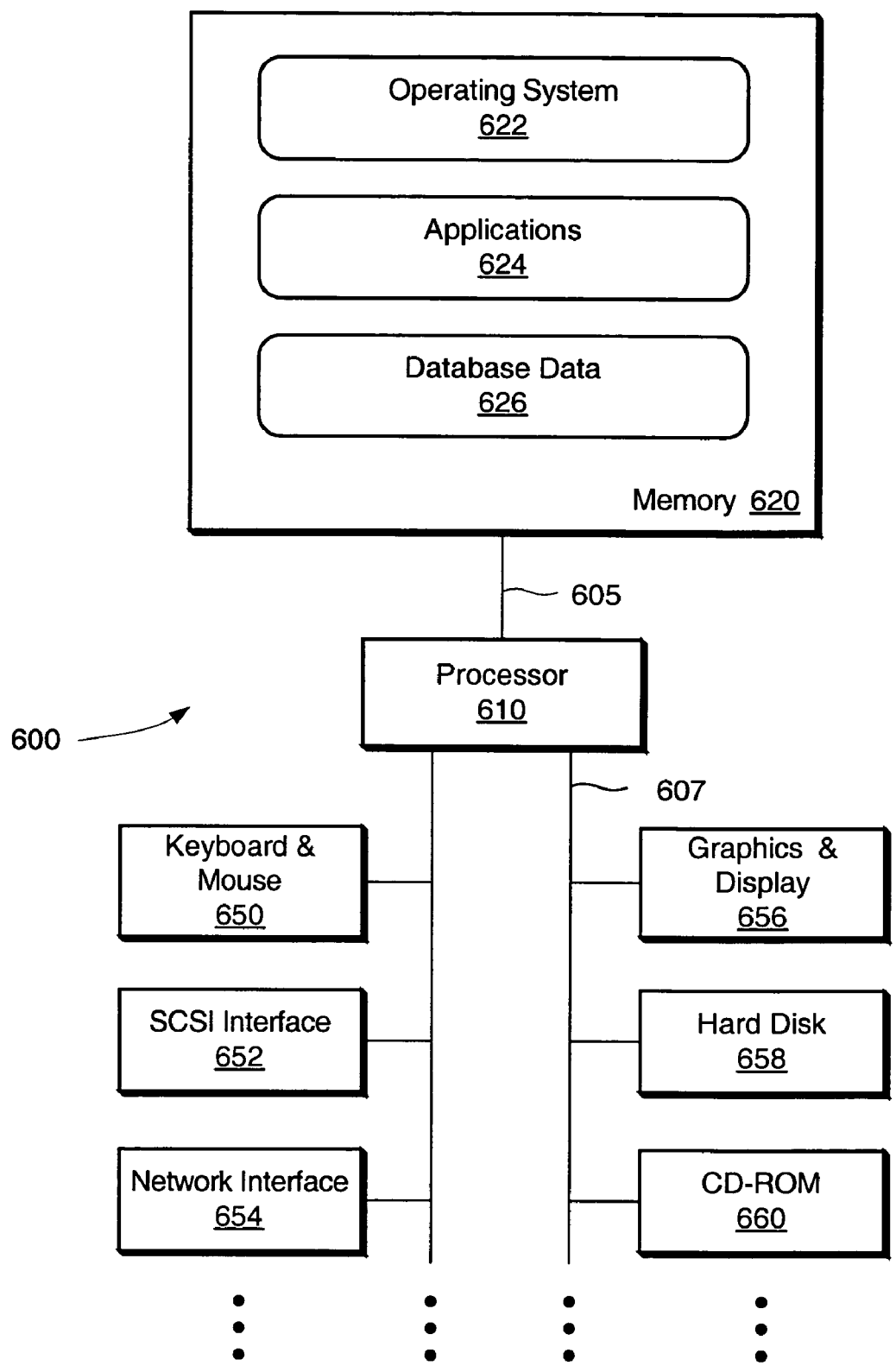
FIG. 6 is a block diagram of a computer system.

FIG. 6 is a block diagram of one implementation of a computer system 600 that may be used for one or more of the techniques described herein. For example, the computer system 600 may be an implementation of one of the previously described servers 210, 220, 250, or 450. The computer system 600 may include a processor 610 and a memory 620 coupled together by a communications bus 605. The processor 610 may be a single processor or a number of individual processors working together. It is also contemplated that the processor 610 may be one or more virtual processors usable with interpreted languages. The memory 620 may be a random access memory (RAM) or some other dynamic storage device and may be capable of storing instructions to be executed by the processor, e.g., an operating system 622 and applications 624, as well as database data 626. The operating system 622 may include software for implementing a file system. The applications 624 may include email servers, database servers, archiving software, interfaces to archiving software, API modules, storage format management software, volume replicators, backup software, CDP software, user interfaces, and others. The memory 620 may also be used for storing temporary variables or other intermediate information during the execution of instructions by the processor 610.

The computer system 600 may also include devices such as a keyboard & mouse 650, a SCSI interface 652, a network interface 654, a graphics & display 656, a hard disk 658, and a CD-ROM 660, all of which are coupled to the processor 610 by a communications bus 607. It will be apparent to those having ordinary skill in the art that the computer system 600 may also include numerous elements not shown in the figure, such as additional storage devices, communications devices, input devices and output devices, as illustrated by the ellipsis shown.

FIGS. 1-6 illustrate some of the many operational examples of the techniques disclosed in the present application. Those having ordinary skill in the art will readily recognize that certain steps or operations described herein may be eliminated or taken in an alternate order. Moreover, the operations discussed with respect to FIG. 5 may be implemented as one or more software programs for a computer system and encoded in a computer readable medium as instructions executable on one or more processors. The computer readable medium may include a solid-state storage medium, a magnetic storage medium, or an optical storage medium, or combinations thereof. The software programs may also be carried in a communications medium conveying signals encoding the instructions. Separate instances of these programs may be executed on separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above may be utilized with a variety of different storage devices and computing systems with variations in, for example, the number of servers and the types of operation of the computing system, e.g., various forms of backup tools, various forms of archiving tools, storage virtualization, I/O operations and addressing techniques.

Those having ordinary skill in the art will readily recognize that the techniques and methods discussed above may be implemented in software using a variety of computer languages, including, for example, traditional computer languages such as assembly language, Pascal and C; object oriented languages such as C++, C# and Java; and scripting languages such as Perl and Tcl/Tk. Additionally, the software 622 or 624 may be provided to the computer system via a variety of computer readable media including electronic media (e.g., flash memory), magnetic storage media (e.g., hard disk 658, a floppy disk, etc.), or optical storage media (e.g., CD-ROM 660). Communications media conveying signals encoding the instructions may also be used to provide the software 622 or 624 (e.g., via a network coupled to the network interface 654).

Although the present invention has been described in connection with several implementations, the invention is not intended to be limited to the specific forms set forth herein. On the contrary, it is intended to cover such alternatives, modifications and equivalents as can be reasonably included within the scope of the invention as defined by the appended claims.

What is claimed is:

1. A method comprising:
  receiving an archive request instruction, wherein:
    the archive request instruction relates to data from a primary data set,
    a first application interacts with the primary data set,
    the first application is executed on a first server, and
    the archive request instruction is compliant with an application programming interface for the first application;
  gathering application data from a secondary data set, wherein:
    the application data is configured for use by the first application,
    the secondary data set is separate from the primary data set,
    the secondary data set comprises data copied from the primary data set,
    the gathering is performed by a gathering circuit, and
    the gathering circuit is configured to obtain information from a plurality of types of secondary data sets;
  obtaining data from the gathered application data, wherein the obtained data is responsive to the archive request instruction;
  responding to the archive request instruction with the obtained data;
  receiving a modification instruction, wherein:
    the modification instruction is compliant with the application programming interface, and
    the modification instruction is related to the obtained data; and
  causing the modification instruction to be performed on the primary data set.

2. The method of claim 1, wherein:
  the primary data set is stored on a production server;
  the secondary data set is a stable copy of the primary data set and is stored on a backup server;
  the gathering circuit comprises a processor executing software instructions adapted to read a plurality of backup formats;
  the obtaining data comprises searching the application data according to criteria specified in the archive request instruction;
  the modification instruction comprises an instruction to replace the obtained data on the primary data set with a reference to an archived copy of the obtained data.

3. The method of claim 1, wherein the gathering comprises generating a complete database from a plurality of files comprising incremental updates.

4. The method of claim 1, wherein the gathering is performed in response to the archive request instruction.

5. The method of claim 1, wherein the gathering comprises generating a partial database from a plurality of files comprising incremental updates.

6. The method of claim 1, wherein the gathering circuit is configured to obtain information from a plurality of types of continuous data protection (CDP) databases.

7. The method of claim 1, wherein the gathering circuit is configured to obtain information from two or more of: a mirror backup database, an intermittently updated backup database, a transaction log shipment continuous data protection (CDP) database, a stable copy and incremental log shipment CDP database, a message shipping CDP database, a file operation shipping CDP database, or a change to block CDP database.

8. The method of claim 1, wherein the receiving the archive request instruction is performed by a receiving circuit configured to interpret instructions for a plurality of types of application programming interfaces.

9. The method of claim 1, wherein the receiving the archive request instruction is performed by a receiving circuit configured to interpret instructions for two or more of: a database application, an email application, or a file system.

10. The method of claim 1, wherein the primary data set is maintained on the first server, and the secondary data set is maintained on a second server separate from the first server.

11. The method of claim 1, wherein the primary data set is stored on the first server, the secondary data set is stored on a second server separate from the first server, and the archive request instruction is received from an archiving application executed on an archiving server separate from the first and second servers.

12. The method of claim 1, wherein the causing the modification instruction to be performed on the primary data set comprises relaying the modification instruction to the first application.

13. The method of claim 1, wherein the causing the modification instruction to be performed on the primary data set comprises generating input/output (I/O) commands in response to the modification instruction and executing the I/O commands on the primary data set.

14. The method of claim 1, wherein the modification instruction comprises an instruction to delete the obtained data from the primary data set.

15. The method of claim 1, wherein the obtained data comprises current data in the primary data set and past data no longer available in the primary data set.

16. The method of claim 1, comprising:
  establishing a connection between an archiving program and the gathering circuit, wherein the archive request instruction is received through the connection.

17. The method of claim 1, comprising:
  after the responding to the archive request instruction, storing the obtained data in a data archive that is separate from the primary and secondary data sets.

18. The method of claim 14, comprising:
  after the responding to the archive request instruction, storing the obtained data in a data archive that is separate from the primary and secondary data sets.

19. The method of claim 1, wherein the obtaining the data from the gathered application data is performed without communicating with the first application.

20. A computer readable storage medium having encoded thereon program instructions executable on a processor, the computer readable storage medium being at least one of an electronic storage medium, a magnetic storage medium, an optical storage medium, where the program instructions are operable to implement each of:
 receiving a archive request instruction, wherein:
  the archive request instruction relates to data from a primary data set,
  a first application interacts with the primary data set,
  the first application is executed on a first server, and
  the archive request instruction is compliant with an application programming interface for the first application;
 gathering application data from a secondary data set, wherein:
  the application data is configured for use by the first application,
  the secondary data set is separate from the primary data set,
  the secondary data set comprises data copied from the primary data set,
  the gathering is performed by a gathering circuit, and
  the gathering circuit is configured to obtain information from a plurality of types of secondary data sets;
 obtaining data from the gathered application data, wherein the obtained data is responsive to the archive request instruction;
 responding to the archive request instruction with the obtained data;
 receiving a modification instruction, wherein:
  the modification instruction is compliant with the application programming interface, and
  the modification instruction is related to the obtained data; and
 causing the modification instruction to be performed on the primary data set.

21. A system comprising:
 a first interface configured to receive and respond to archive instructions, wherein:
  the archive instructions relate to data from a primary data set,
  a first application interacts with the primary data set,
  the first application is executed on a first server, and
  the archive instructions are compliant with an application programming interface for the first application;
 a second interface comprising a processor, coupled to the first interface, and configured to gather application data from a secondary data set, and to obtain data from the gathered application data, wherein:
  the application data is configured for use by the first application,
  the secondary data set is separate from the primary data set,
  the secondary data set comprises data copied from the primary data set,
  the processor is configured to obtain information from a plurality of types of secondary data sets, and
  the obtained information is responsive to the archive instructions; and
 a third interface coupled to the first interface and configured to cause modifications on the primary data set in response to modification instructions received by the first interface, wherein:
  the modification instructions are compliant with the application programming interface, and
  the modification instructions are related to the obtained data.

22. The system of claim 21, wherein:
 the first server comprises a production server;
 the secondary data set is a stable copy of the primary data set and is stored on a backup server;
 the processor is configured to read a plurality of backup formats;
 the second interface is configured to obtain the data by searching the application data according to criteria specified in instructions received by the first interface;
 the third interface is configured to replace the obtained data on the primary data set with a reference to an archived copy of the obtained data.

23. The system of claim 21, wherein the second interface is configured to obtain information from a plurality of types of continuous data protection (CDP) databases.

24. The system of claim 21, wherein the primary data set is stored on the first server, the secondary data set is stored on a second server separate from the first server, and the archive request instruction is received from an archiving application executed on an archiving server separate from the first and second servers.

25. The system of claim 21, wherein the third interface is configured to relay the modification instructions to the first application.

26. The system of claim 21, wherein the third interface is configured to generate input/output (I/O) commands in response to the modification instructions and execute the I/O commands on the primary data set.

27. The system of claim 21, wherein the obtained data comprises current data in the primary data set and past data no longer available in the primary data set.

28. A system comprising:
 means for receiving an archive request instruction, wherein:
  the archive request instruction relates to data from a primary data set,
  a first application interacts with the primary data set,
  the first application is executed on a first server, and
  the archive request instruction is compliant with an application programming interface for the first application;
 means for gathering application data from a secondary data set, wherein:
  the application data is configured for use by the first application,
  the secondary data set is separate from the primary data set,
  the secondary data set comprises data copied from the primary data set,
  the means for gathering comprises a gathering circuit configured to obtain information from a plurality of types of secondary data sets;
 means for obtaining data from the gathered application data, wherein the obtained data is responsive to the archive request instruction;
 means for responding to the archive request instruction with the obtained data;
 means for receiving a modification instruction, wherein:
  the modification instruction is compliant with the application programming interface, and
  the modification instruction is related to the obtained data; and means for causing the modification instruction to be performed on the primary data set.

29. The method of claim 1, wherein the gathering the application data from the secondary data set is performed without communicating with the first application.

30. The method of claim 19, wherein the causing the modification instruction to be performed on the primary data set comprises passing the modification instruction to the first application.

\* \* \* \* \*